US012738129B2

(12) United States Patent
Dimatteo, III

(10) Patent No.: US 12,738,129 B2
(45) Date of Patent: Sep. 15, 2026

(54) PLAY UNTIL YOU WIN AMUSEMENT MACHINE

(71) Applicant: Nicholas Dimatteo, III, Flower Mound, TX (US)

(72) Inventor: Nicholas Dimatteo, III, Flower Mound, TX (US)

( * ) Notice: Subject to any disclaimer, the term of this patent is extended or adjusted under 35 U.S.C. 154(b) by 121 days.

(21) Appl. No.: 18/408,537

(22) Filed: Jan. 9, 2024

(65) Prior Publication Data

US 2024/0233494 A1 Jul. 11, 2024

Related U.S. Application Data

(60) Provisional application No. 63/437,968, filed on Jan. 9, 2023.

(51) Int. Cl.
*G07F 17/32* (2006.01)

(52) U.S. Cl.
CPC ........ *G07F 17/3297* (2013.01); *G07F 17/323* (2013.01); *G07F 17/3239* (2013.01); *G07F 17/3279* (2013.01)

(58) Field of Classification Search
CPC ............... G07F 17/3297; G07F 17/323; G07F 17/3239; G07F 17/3279
See application file for complete search history.

(56) References Cited

U.S. PATENT DOCUMENTS 9,526,978 B1 * 12/2016 Shoemaker, Jr. ... G07F 17/3251

* cited by examiner

*Primary Examiner* — Jeffrey K Wong
(74) *Attorney, Agent, or Firm* — White-Welker & Welker, LLC; Matthew T. Welker, Esq.

(57) ABSTRACT

Play till you win (PTYW) crane claw machine teaching a competitive game play between two linked machines, or a dedicated multi-player machine. Each respective player of the two machines/claws is playing against each other in an effort to be the first to drop a prize in their and be declared the winner, as the machine will only dispense one prize, that to the winner, and gameplay will continue until there is a winner. The machines may be further comprised of a sabotage button which allows any player to sabotage another player or all other players, to temporarily lose grip strength/power and drop any prizes that have been picked up but have not yet been released in the prize area/chute. Cabinets equipped with cameras and video displays for capturing video of the gameplay fields and/or the players.

25 Claims, 8 Drawing Sheets

PLAY UNTIL YOU WIN AMUSEMENT MACHINE

TECHNICAL FIELD OF THE INVENTION

The present invention relates generally to an amusement game machine. More specifically, the present invention relates to a play until you win every time claw crane amusement game machine that also enables competitive and interactive play.

BACKGROUND OF THE INVENTION

The claw machine is infamous in arcades and will always be one of the more popular choices for arcades to have as an option for its consumers. In arcades, claw machines are crowd magnets and understandably so. Most people have a soft spot for adorable plushies perched in well-lit boxes, just begging to be taken home. The claw machine is both loved and hated by players because it's a game of both skill and chance. Many also love the thrill of knowing that the toy of their prize could fall into their hands (or out of it) with one skillful move.

What is needed is to bring more excitement and to defer the bad feelings a player has when a loss occurred from the machine or arcade operator is a play until you win every time crane claw machine that provides for competitive multiplayer arrangements, interactive play, and increased attention and social presence during and after gameplay.

SUMMARY OF THE INVENTION

The present invention is a play till you win (PTYW) crane claw machine. The physical machines shown can be installed in an enclosed room, an open room/bar area, entryway, game rooms, restaurant, restaurant sections, customer gathering areas, or prize redemption areas in an arcade, casino, Location Based Entertainment (LBE), Family Entertainment Centers (FEC), or similar establishments.

One exemplary embodiment of the present invention is the taking two crane machines and merging them into a single cabinet. The internal operating mechanism of each respective crane could be that as currently known in the prior art as the mechanics of a crane machine and claw have been well known and worked out over many years. In this embodiment, the present invention teaches a competitive game play between two linked machines, or a dedicated machine which emulates two link machines placed side by side.

In the present invention, the gameplay is a play till you win (PTYW) where each respective player of the two machines/claws is playing against each other in an effort to be the first to drop a prize in their prize chute and be declared the winner, as the machine will only dispense one prize, that to the winner, and gameplay will continue until there is a winner.

In other player arrangements and numbers, different shapes may be desirable. For example, in a two player orientation the player could be positioned side by side on a two player machine or two individual machines located adjected to each other. In a three play shape, a three player crane machine may take the shape of a triangle or a larger circumference round shape, in a four person player embodiment the cabinet may take the shape of a larger cube where a player is position on each of the sides of the cabinet.

In a four player configuration, single cabinet embodiment as shown in FIG. 3, each side or station presents an identical player experience and play and control set up, but each player would be competing on the same playfield for the same prizes where they would not play for a fixed period of time or number of grabs/drops, they would be competing against each other until one of the players wins.

It should be noted that in each of the multi-player embodiments, a PTYW competition would occur anytime two or more players are competing. The PTYW game is enabled to be played with the maximum players at a cabinet/until, any plurality of players, or as a traditional crane machine when only one player is present.

In another embodiment, the machines may be further comprised of a sabotage button, which allows any player to sabotage another player or all other players, to temporarily lose grip strength/power and drop any prizes that have been picked up but have not yet been released in the prize area/chute. In this method of game play, each player will have one or possibly more chances to sabotage another player. In alternative embodiments, the sabotage play may be available only at additional cost, creating a secondary income stream from the game for operators.

In still yet another embodiment, the cabinet backs of single machines linked for game play, or other machines, possibly on top or the marquee may be equipped with cameras and video displays for capturing video of the gameplay fields and/or the players for use. In some cases, cameras could capture video of the game play fields of connected machines that are in different or remote locations so that players can monitor the gameplay of their competitors, which would be crucial for properly executing a sabotage in other embodiments. In another case, the camera can be used to take pictures of the game winner for distribution to other machine displays after a win occurs. This would allow remote machines to see images of the winners of a game, and also provide excitement and recognition for winning players in and around arcades and other locations where the machines are located, which can add excitement and draw to the machines and locations.

BRIEF DESCRIPTION OF THE DRAWINGS

The accompanying drawings, which are incorporated herein a form a part of the specification, illustrate the present invention and, together with the description, further serve to explain the principles of the invention and to enable a person skilled in the pertinent art to make and use the invention.

DETAILED DESCRIPTION OF THE INVENTION

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized, and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known structures and techniques known to one of ordinary skill in the art have not been shown in detail in order not to obscure the invention. Referring to the figures, it is possible to see the various major elements constituting the apparatus of the present invention.

Now referring to the Figures, the present invention is a play till you win (PTYW) crane claw machine. The present invention is a play till you win (PTYW) crane claw machine. The physical machines shown can be installed in an enclosed room, an open room/bar area, entryway, game rooms, restaurant, restaurant sections, customer gathering areas, or prize redemption areas in an arcade, casino, Location Based Entertainment (LBE), Family Entertainment Centers (FEC), or similar establishments.

Figure 1:
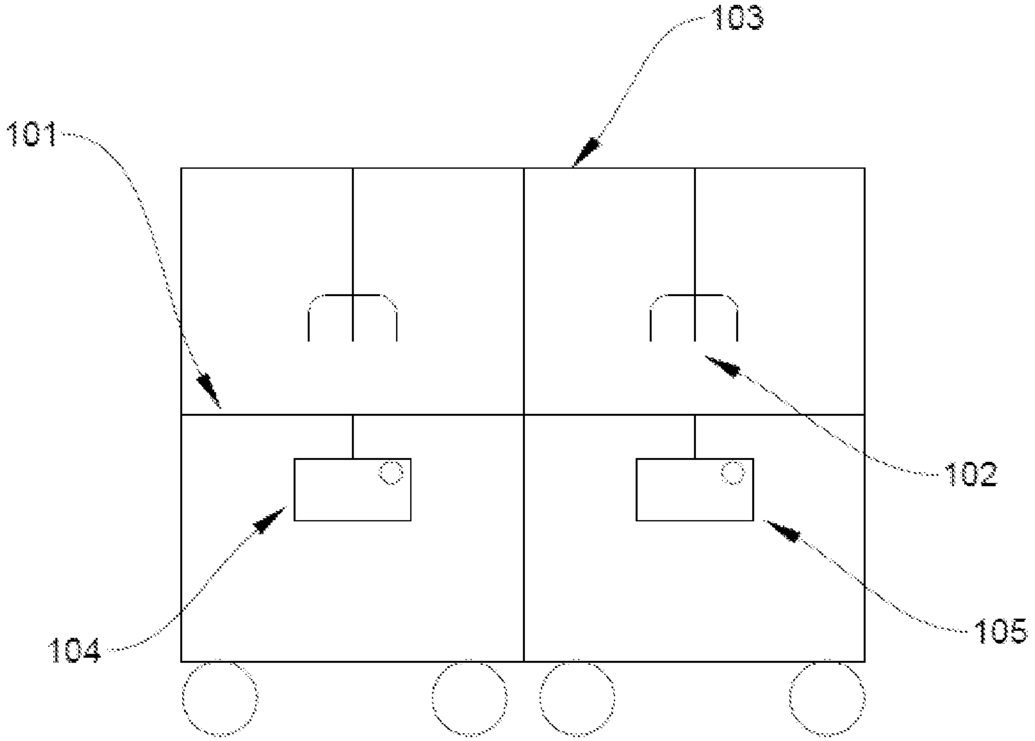
FIG. 1 is a first embodiment of the present invention illustrating two games in one cabinet.

Now referring to FIG. 1, one exemplary embodiment of the present invention is the taking two crane machines 101 and 102 and merging them into a single cabinet 103. The internal operating mechanism of each respective crane could be that as currently known in the prior art as the mechanics of a crane machine and claw have been well known and worked out over many years.

Figure 7:
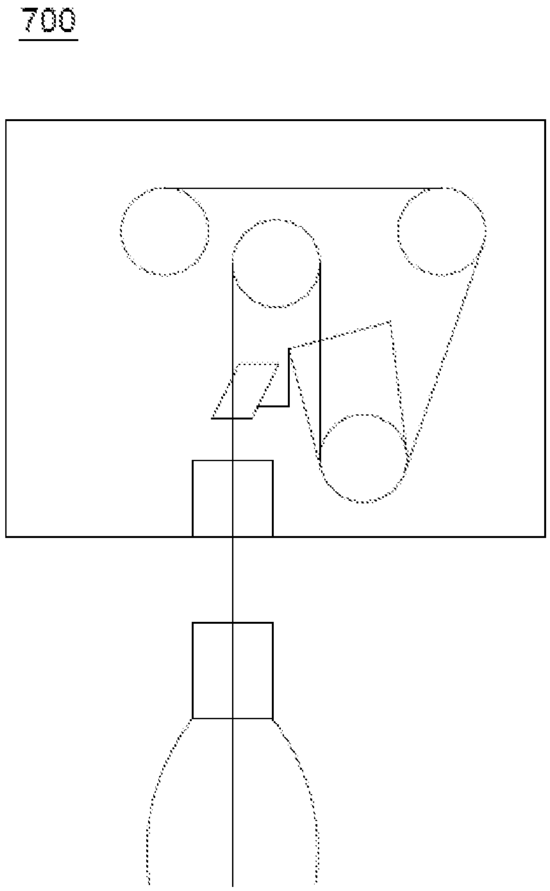
FIG. 7 illustrates one possible internal crane claw mechanism taught by the present invention.

FIG. 7 illustrates one possible internal crane claw mechanism 700 taught by the present invention. In this embodiment, the present invention teaches a competitive game play between two linked machines 101 and 102, or a dedicated machine which emulates two link machines placed side by side.

In the present invention, the gameplay is a play till you win (PTYW) where each respective player of the two machines/claws 101 and 102 is playing against each other in an effort to be the first to drop a prize in their and be declared the winner, as the machine 103 will only dispense one prize, that to the winner, and gameplay will continue until there is a winner.

While typically claw machines use a prize chute, in some embodiments, the claw machines used by the present invention may incorporate prize sensing. A prize sensing system is used when a player must drop a prize or item in a prize area or a specific area (landing pad) that would trigger a win instead of getting to a certain area or prize chute.

Figure 2:
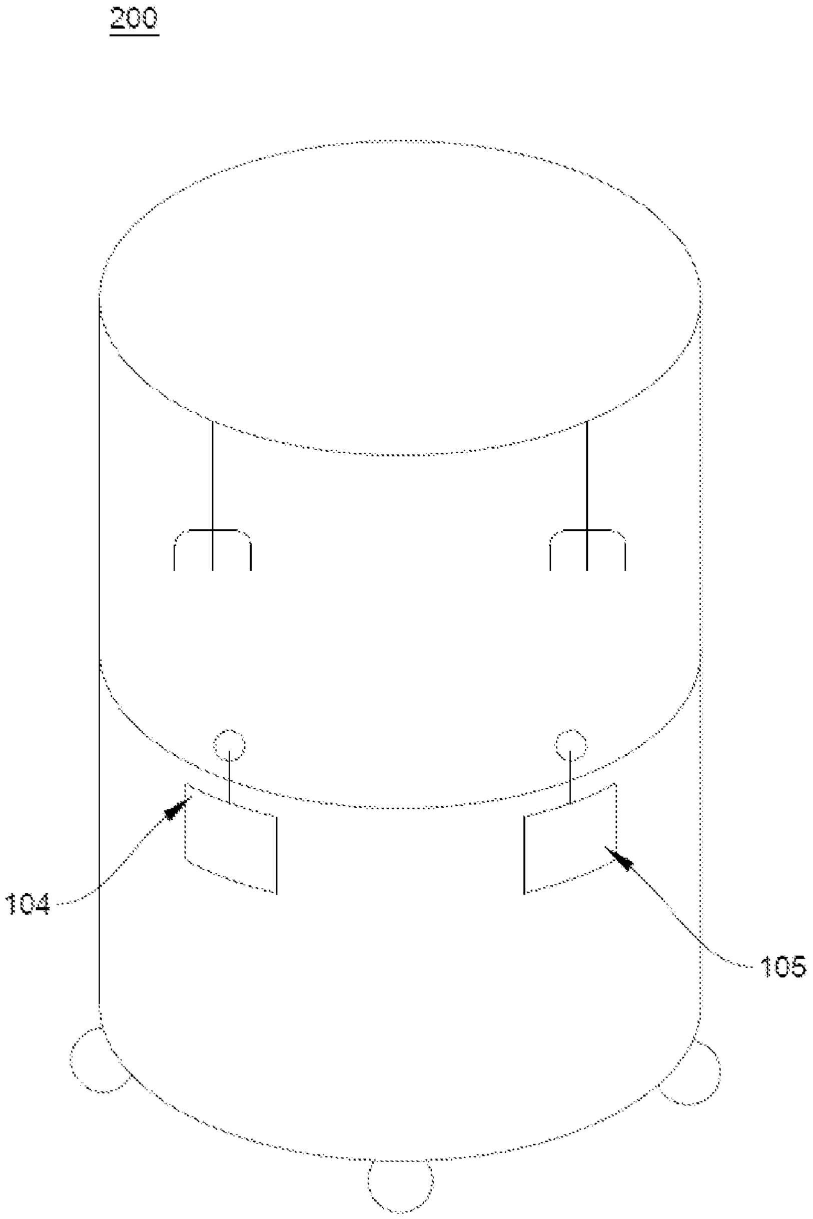
FIG. 2 is a second embodiment of the present invention illustrating a two player round cabinet.
Figure 3:
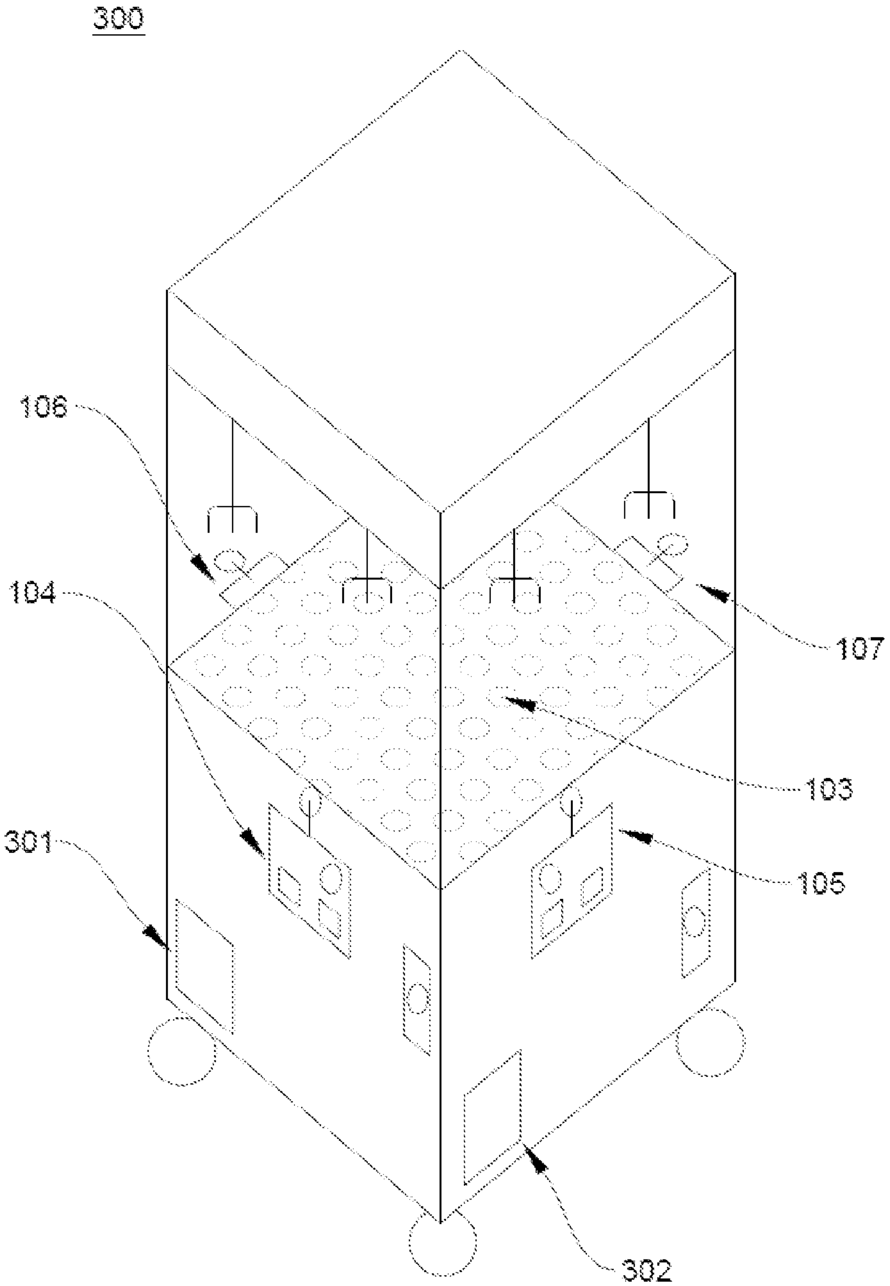
FIG. 3 is a third embodiment of the present invention illustrating a four player square/rectangular cabinet.
Figure 4:
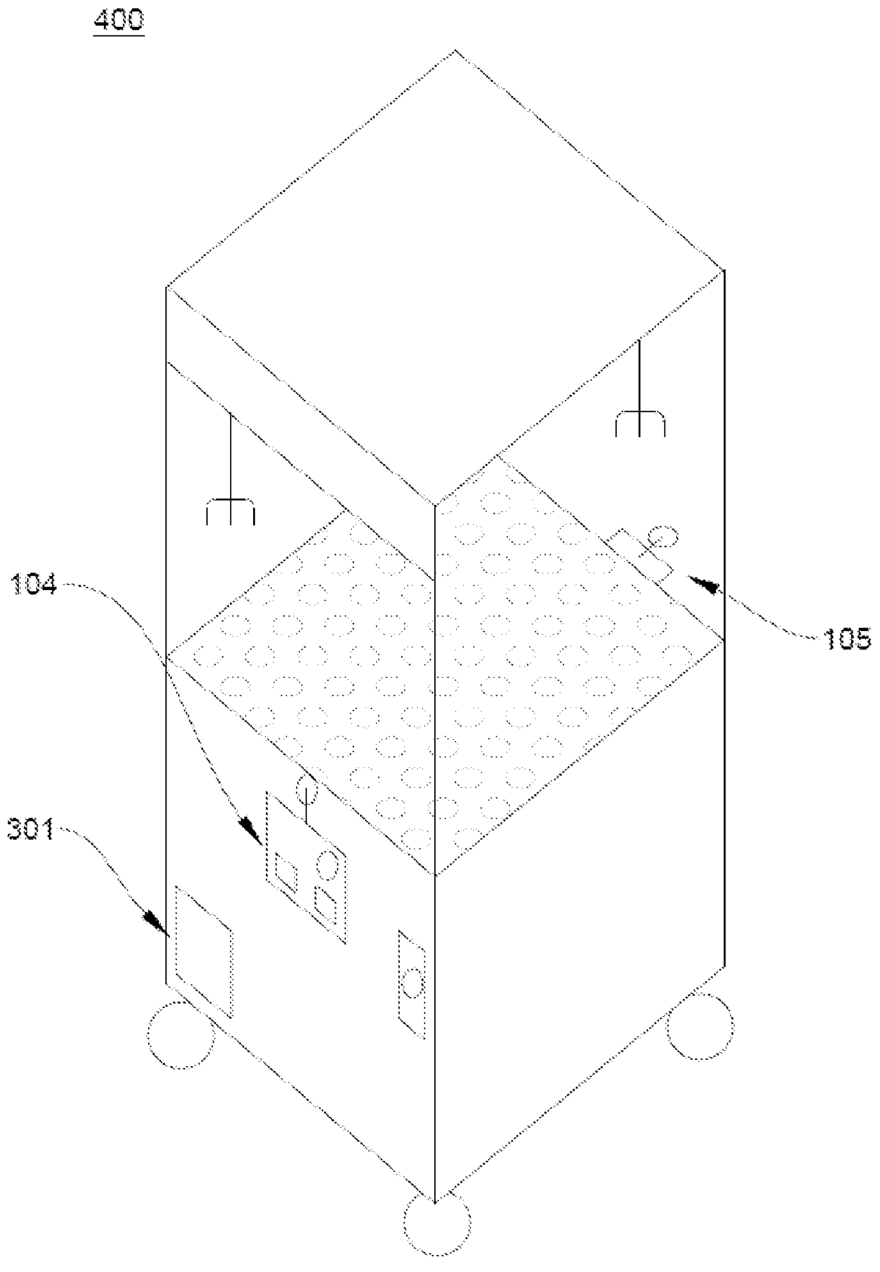
FIG. 4 is a fourth embodiment of the present invention illustrating a two player, single cabinet machine where the player positions are located on opposing sides of the square/rectangular cabinet.

A main board/controller will control linking of two or more standard crane machines or multi-player machines and will provide the standard crane game play to a single player, or to multiple players simultaneously in a multi-player embodiments in a single unit/machines 200, 300, and 400 as illustrated in FIGS. 2-4 or between two or more linked machines.

Now referring to FIG. 2, a round crane machine 200 embodiment is illustrated. Here, unlike the first embodiment where two machines are placed alongside each other, or a single cabinet is created to house two machines or create a single double machine, the shape of the machines can vary depending on the number of players. In these alternative embodiments, two player machines could take on many shapes such as the rectangular/square layout 102 and 103 for side by side play as shown in FIG. 1, a round configuration 200 for a more face-off style of competition as shown in FIG. 2, or even a true face-off cabinet 400 as shown in FIG. 4 where players are placed on opposing sides of a square or rectangular cabinet, each having their own full controls, game interface, and.

In other player arrangements and numbers, different shapes may be desirable. For example, in a three play shape, a three player crane machine may take the shape of a triangle or a larger circumference round shape, in a four person player embodiment the cabinet may take the shape of a larger cube 300 where a player is positioned on each of the sides of the cabinet as shown in FIG. 3.

In a four player configuration, in a single cabinet embodiment as shown in FIG. 3, each side or station presents an identical player experience and play and control set up 104, 105, 106, and 107, but each player would be competing on the same playfield 303 for the same prizes where they would not play for a fixed period of time or number of grabs/drops, they would be competing against each other until one of the players wins.

It should be noted that in each of the multi-player embodiments, a PTYW competition would occur anytime two or more players are competing.

Figure 5:
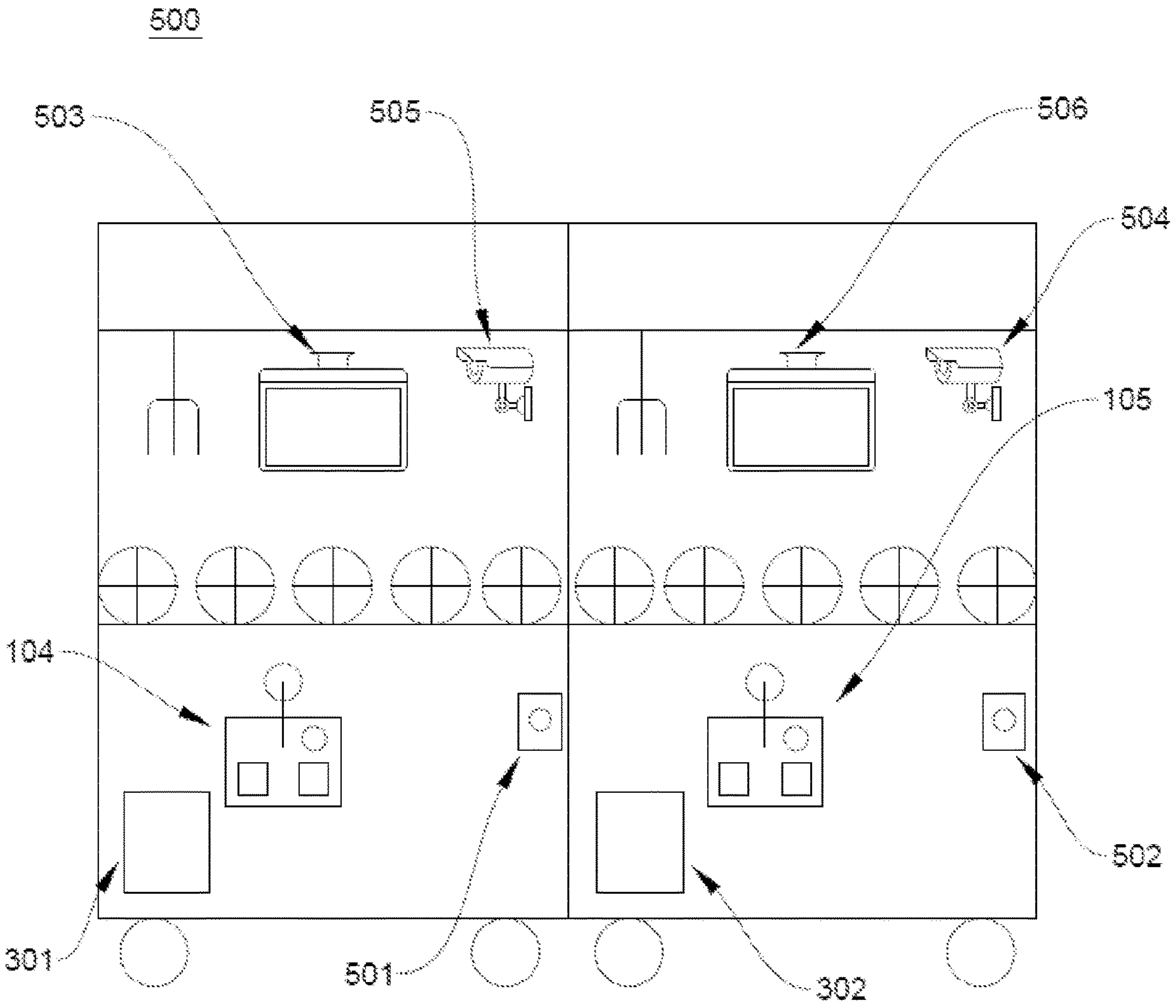
FIG. 5 illustrates the side by side multi-player layout taught by the present invention with additional features.

Now referring to FIG. 5, the side by side multi-player layout 500 is shown with additional features. In this embodiment, two opposing two-player machines as shown in FIG. 4 are placed side by side creating 4 player positions or stations. The four stations are then identified by four different colors or color themes where each color corresponds to a crane/claw controlled by the corresponding station button.

In one game play option, when players credit the game there is a color representation for each station. When someone wins, the other games turn red and have a losing sound.

In an alternative win-win mode, all games (four being the most common configuration) have a hidden or purchased mode that allows everyone to play until they win, but whoever wins first gets an additional play which can be free play or play till you win.

In another alternative game play, the machines can be configured as a single play to win game, or a multiple play to win game with multiple "rounds". For example, in one embodiment a four player machine 500 such as that shown in FIG. 5. can be configured for three rounds of game play, where it's a WIN WIN WIN game. The game play is still PTYW, but the game is played until three prizes are won and then all machines are turned off until a new game starts. Actual game play may be in "rounds" where the machine resets after each prize is one, or the game play may be continuous until three prizes are detected by the s for all active stations.

Figure 6:
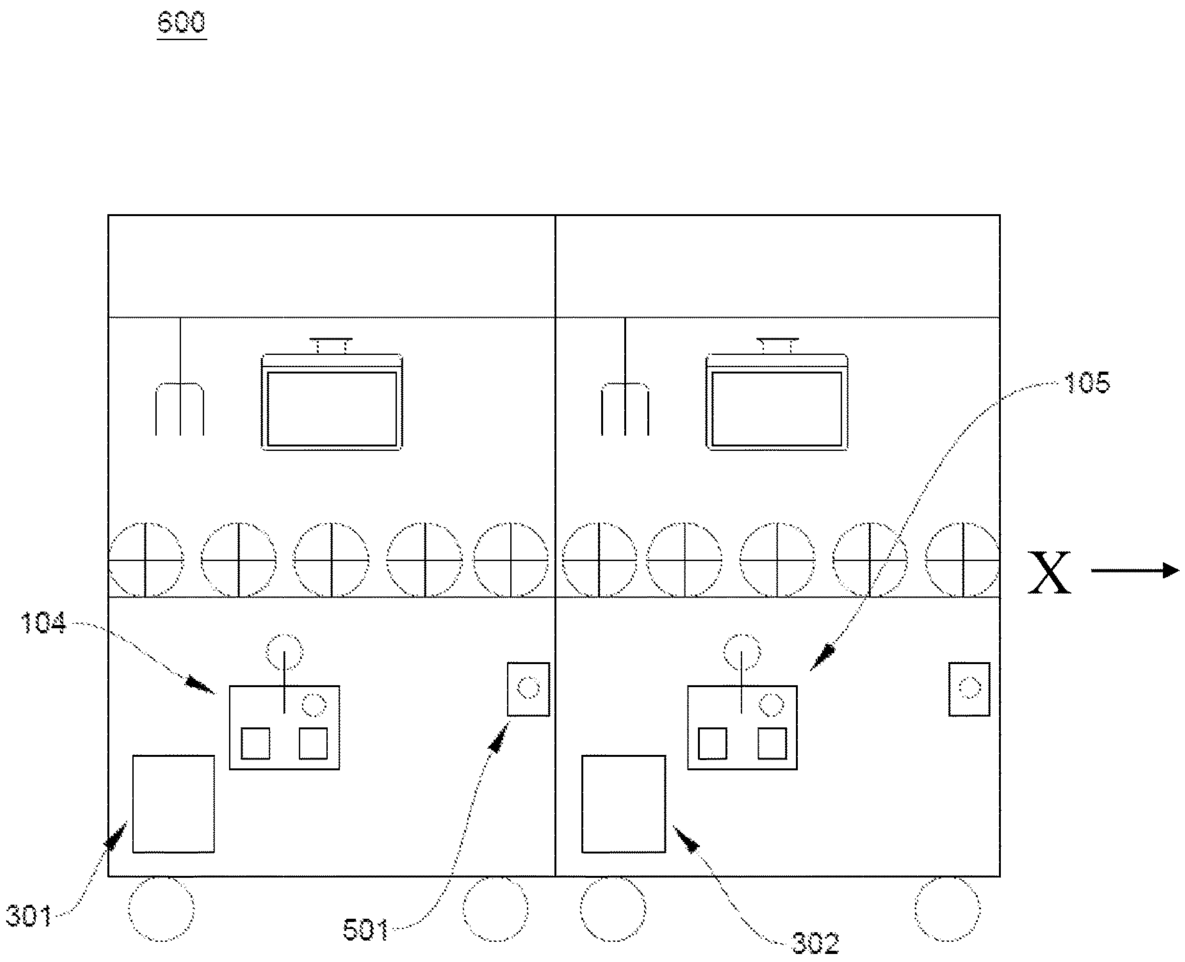
FIG. 6 a coin, swipe, or player activated machine taught by the present invention is illustrated.

Now referring to FIG. 6, a coin, swipe, or player activated machine 600 is illustrated. The machine 600 can be single, double, or any combination of more than two. The optimal usage is four units. As a single it operates as a traditional crane machine. When there is more than one player, the machines are linked and once all players activate their respective machines, all the machines become PTYW. All players will then compete and race to pick up and drop their item in the prize area/chute 301 and 302.

Once the winning machine detects that an item has entered the prize area, chute 301 and 302 or designated area all other machines will release items in their grasp (all machines will lose gripping power, which would result in one winner in all but the closest competitions where prizes may be release simultaneously over a prize areas/chutes 301 and 302 or reach the prize area/chute 301 and 302 with a prize almost simultaneously.

In alternative embodiments, multiple machines may be connected either wirelessly or have wired means for enabling such connected gameplay and competition among players and machines.

In yet another embodiment, the machines may be further comprised of a sabotage button 501 and 502, which allows any player to sabotage another player or all other players, to temporarily lose grip strength/power and drop any prizes that have been picked up but have not yet been released in the prize area/chute 301 and 302. In this method of game play, each player will have one or possibly more chances to sabotage another player or players.

In alternative embodiments, the sabotage play may be available only at additional cost, creating a secondary income stream from the game for operators.

In still yet another embodiment, the cabinet backs of single machines linked for game play, or other machines, possibly on top or the marquee may be equipped with cameras 503 and 504 and video displays 505 and 506 for capturing video of the gameplay fields and/or the players for use.

In some cases, cameras 503 and 504 could capture video of the game play fields of connected machines that are in different or remote locations so that players can monitor, via displays 505 and 506, the gameplay of their competitors, which would be crucial for properly executing a sabotage in other embodiments.

In another case, the cameras 503 and 504 can be used to take pictures of the game winner for distribution to other machine displays 505 and 506 after a win occurs. This would allow remote machines to see images of the winners of a game, and also provide excitement and recognition for winning players in and around arcades and other locations where the machines are located, which can add excitement and draw players to the machines and locations.

Figure 8:
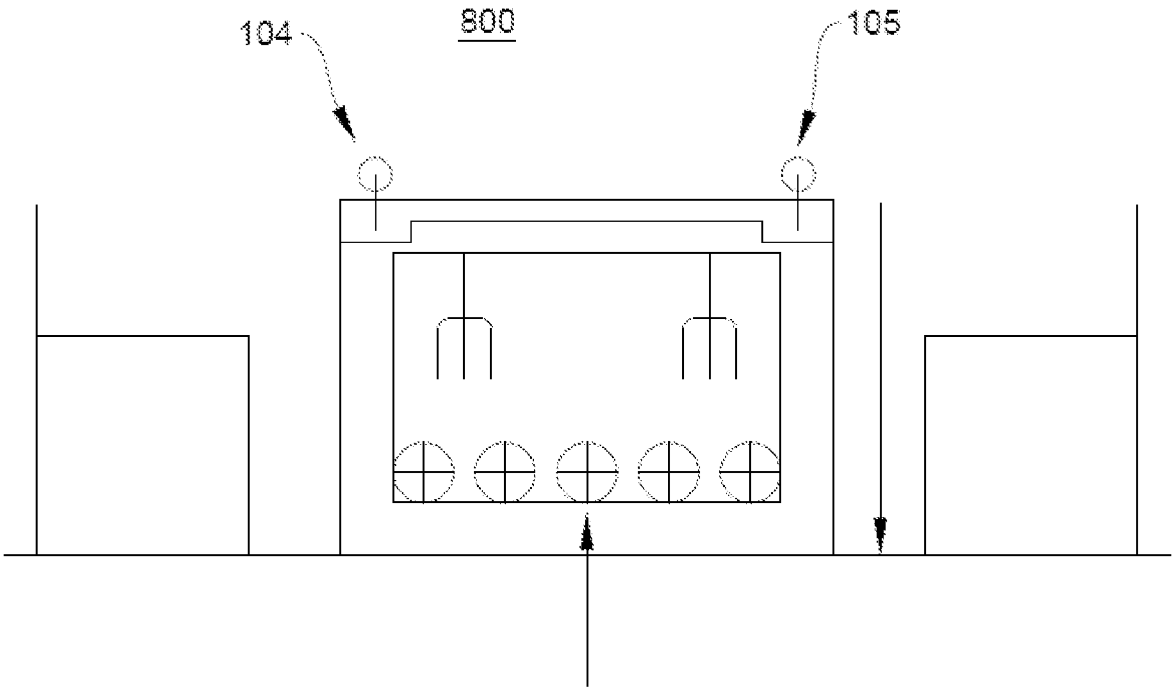
FIG. 8 illustrates a low-boy type crane embodiment, where the crane is set up like a table top allowing all players to see each other.

FIG. 8 illustrates a low-boy type crane embodiment 800, where the crane is set up like a table top allowing all players to see each other. This is another possible format for delivering a PTYW crane machine game, while also allowing the players to see each other without the need for additional complexity that using cameras and displays would create to deliver a similar experience.

In another embodiment, a twelve player version with or without an announcer can be created for use in a theme park or in a larger casino or arcade setting where significant numbers of potential players would be congregated and/or where it would be desirable to offer a large player version to allow large groups the ability for a large number of selected players to compete against each other, or selected players from two or more groups to play against each other in a team versus team setting.

In another embodiment, a QR code is displayed to capture player data. Before or after the game, a player is prompted to sign in and record the winning game. This data can be used for tracking the winning players.

Thus, it is appreciated that the optimum dimensional relationships for the parts of the invention, to include variation in size, materials, shape, form, function, and manner of operation, assembly and use, are deemed readily apparent and obvious to one of ordinary skill in the art, and all equivalent relationships to those illustrated in the drawings and described in the above description are intended to be encompassed by the present invention.

Furthermore, other areas of art may benefit from this method and adjustments to the design are anticipated. Thus, the scope of the invention should be determined by the appended claims and their legal equivalents, rather than by the examples given.

The embodiments of the invention in which an exclusive property or privilege is claimed are defined as follows:

1. A play till you win (PTYW) crane claw machine, comprising
- taking two crane machines and merging them into a single cabinet;
- a competitive game played between two linked machines, or a dedicated machine which emulates two linked machines placed side by side;
- wherein
  - the two linked machines are configured as a win-win mode/game;
  - all games having either a hidden mode or a purchased mode that allows everyone to play until they win; and
  - whoever wins first gets an additional play, which can be free play or play till you win.

2. The PTYW crane claw machine of claim 1, wherein
- a gameplay is a play till you win (PTYW) where each respective player of a two machines/claws is playing against each other in an effort to be a first to drop a prize in their prize chute and be declared the winner, as a machine will only dispense one prize, to a winner, and gameplay will continue until there is a winner.

3. The PTYW crane claw machine of claim 1, wherein
- the single cabinet houses two machines to create a single double machine,
- a shape of the machines can vary depending on a number of players.

4. The PTYW crane claw machine of claim 3, wherein
- a two player machine has a rectangular/square layout for side by side play.

5. The PTYW crane claw machine of claim 3, wherein
- a two player machine has a round shape for a more face-off style of competition or even a true face-off cabinet where players are placed on opposing sides, each having their own full controls and game interface.

6. The PTYW crane claw machine of claim 3, wherein
- players are placed on opposing sides of a square or rectangular cabinet, each having their own full controls and game interface.

7. The PTYW crane claw machine of claim 3, wherein
- in a three play shape, a three player crane machine may take a shape of a triangle or a larger circumference round shape.

8. The PTYW crane claw machine of claim 3, wherein
- in a four person player embodiment a cabinet may take a shape of a larger cube where a player is position on each of a side of the cabinet.

9. The PTYW crane claw machine of claim 3, wherein
- in a four player, single cabinet embodiment,
  - each side or station presents an identical player experience and play, and control set up, but each player would be competing on a same playfield for a same prize where each player would not play for a fixed period of time or number of grabs/drops, and they compete against each other until one player wins.

10. The PTYW crane claw machine of claim 3, wherein multiple machines are connected physically or merged into the single cabinet or any shape to create a twelve player version;

two or more machines are either wirelessly or have wired means for enabling such connected gameplay and competition among players and machines; and the twelve player version operated with or without an announcer for use in a theme park or in a larger casino or arcade setting where significant numbers of potential players are congregated.

11. The PTYW crane claw machine of claim 1, wherein in each of a multi-player embodiments, a PTYW competition would occur anytime two or more players are competing.

12. The PTYW crane claw machine of claim 1, wherein a PTYW game play only with a maximum players at a cabinet/unit, or to play with any combination of two or more players.

13. The PTYW crane claw machine of claim 12, wherein when just one person wants to play on a multi-player unit or machine, then a unit or machine will function like a traditional crane.

14. The PTYW crane claw machine of claim 1, wherein in a side by side multi-player layout, two opposing two-player machines are placed side by side creating four player positions or stations;

the four player positions or stations are then identified by four different colors or color themes where each color corresponds to a crane/claw controlled by a corresponding station button;

when players credit a game there is a color representation for each station; and when a player wins, the other stations turn red and have a losing sound.

15. The PTYW crane claw machine of claim 1, wherein two or more machines are configured as a single play to win game, or a multiple play to win game with multiple prizes;

the machines are configured for a plurality of prize wins of game play, a game play is still PTYW, but the game is played until the plurality of prizes are won, and then all machines are turned off until a new game starts.

16. The PTYW crane claw machine of claim 15, wherein actual game play may be in "rounds" where a machine resets after each prize is won, or the game play may be continuous until three prizes are detected for all active stations.

17. The PTYW crane claw machine of claim 1, further comprising one or more coin, swipe, or player activated machines;

the activated machines are single, double, or any combination of more than two;

an optimal usage is four units;

as a single it operates as a traditional crane machine; and when there is more than one player, the machines are linked and once all players activate their respective activated machines, all the machines become PTYW;

all players will then compete and race to pick up and drop their item in a prize area/chute;

once a winning activated machine detects that an item has entered a prize area, chute or designated area all other machines will release items in their grasp; and all activated machines will lose gripping power, which would result in one winner in all but the closest competitions where prizes may be release simultaneously over a prize areas/chutes or reach the prize area/chute with a prize almost simultaneously.

18. The PTYW crane claw machine of claim 1, wherein multiple machines are connected either wirelessly or have wired means for enabling a connected gameplay and competition among players and machines.

19. The PTYW crane claw machine of claim 1, further comprising a sabotage button, which allows any player to sabotage another player or all other players, to temporarily lose grip strength/power and drop any prizes that have been picked up but have not yet been released in a prize area/chute.

20. The PTYW crane claw machine of claim 19, wherein each player will have one or possibly more chances to sabotage another player.

21. The PTYW crane claw machine of claim 19, wherein a sabotage play is available only at additional cost, creating a secondary income stream from a game for operators.

22. The PTYW crane claw machine of claim 1, wherein a cabinet is equipped with cameras and video displays for capturing video of a gameplay fields and/or a players for use; and a QR code is displayed to capture player data;

before or after a game, a player is prompted to sign in and record a winning game; and this data can be used for tracking a winning player.

23. The PTYW crane claw machine of claim 22, wherein cameras capture video of a game play fields of connected machines that are in different or remote locations so that players can monitor a gameplay of their competitors.

24. The PTYW crane claw machine of claim 22, wherein the cameras can be used to take pictures of a game winner for distribution to other machine displays after a win occurs.

25. A play till you win (PTYW) crane claw machine, comprising linking two or more crane machines;

a main board/controller will control linking of two or more standard crane machines or multi-player machines;

the main board/controller provide a standard crane game play to a single player, or to multiple players simultaneously in a multi-player embodiment in a single unit/machine or between two or more linked machines; and a competitive game played between two linked machines, or a dedicated machine which emulates two linked machines placed side by side;

wherein the two linked machines are configured as a win-win mode/game;

all games having either a hidden mode or a purchased mode that allows everyone to play until they win; and whoever wins first gets an additional play, which can be free play or play till you win.

* * * * *